(12) United States Patent
Hu et al.

(10) Patent No.: US 11,589,300 B2
(45) Date of Patent: *Feb. 21, 2023

(54) INTENT-BASED SERVICE ENGINE FOR A 5G OR OTHER NEXT GENERATION MOBILE CORE NETWORK

(71) Applicant: AT&T INTELLECTUAL PROPERTY I, L.P., Atlanta, GA (US)

(72) Inventors: Qingmin Hu, Sammamish, WA (US); Brian Daly, Peachtree Corners, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,768

(22) Filed: Jun. 9, 2021

(65) Prior Publication Data
US 2021/0297944 A1    Sep. 23, 2021

Related U.S. Application Data

(63) Continuation of application No. 15/365,910, filed on Nov. 30, 2016, now Pat. No. 11,064,426.

(51) Int. Cl.
*H04W 48/18* (2009.01)
*H04W 8/18* (2009.01)
*H04W 12/08* (2021.01)
*H04W 48/02* (2009.01)

(52) U.S. Cl.
CPC ............. *H04W 48/18* (2013.01); *H04W 8/18* (2013.01); *H04W 12/08* (2013.01); *H04W 48/02* (2013.01)

(58) Field of Classification Search
CPC ..... H04W 12/08; H04W 48/02; H04W 48/18; H04W 8/18
See application file for complete search history.

(56) References Cited

U.S. PATENT DOCUMENTS

| 7,290,039 | B1 | 10/2007 | Lisitsa et al. |
|---|---|---|---|
| 7,349,767 | B2 | 3/2008 | Kuge et al. |
| 7,707,267 | B2 | 4/2010 | Lisitsa et al. |
| 7,710,900 | B2 | 5/2010 | Andrews et al. |

(Continued)

OTHER PUBLICATIONS

Non-Final Office Action received for U.S. Appl. No. 15/365,910 dated May 31, 2018, 25 pages.

(Continued)

*Primary Examiner* — Ankur Jain
(74) *Attorney, Agent, or Firm* — Amin, Turocy & Watson, LLP

(57) ABSTRACT

A context-aware network service engine is employed to support integrated network. In one aspect, the network service engine can receive a message associated with the user's intent and/or situation via a standard and/or open application programming interface (API). Based on an analysis of the message with context data and/or defined policy data, the network service engine can establish procedures to provide integrated services. The integrated services can comprise multiple communication services that are initiated simultaneously (or substantially simultaneously) in response to receiving the message. As an example, the context data can comprise user-related data, real-time network resource availability, presence data, and the like. As an example, the network services can be initiated concurrently and/or in a specified order.

20 Claims, 10 Drawing Sheets

(56) References Cited

U.S. PATENT DOCUMENTS

| | | |
|---|---|---|
| 8,121,618 B2 | 2/2012 | Rhoads et al. |
| 8,977,293 B2 | 3/2015 | Rodriguez et al. |
| 9,118,771 B2 | 8/2015 | Rodriguez et al. |
| 2007/0032225 A1 | 2/2007 | Konicek et al. |
| 2012/0157038 A1 | 6/2012 | Menezes et al. |
| 2013/0007201 A1 | 1/2013 | Jeffrey et al. |
| 2013/0166726 A1 | 6/2013 | Boldyrev et al. |
| 2014/0253666 A1 | 9/2014 | Ramachandran et al. |
| 2015/0056952 A1 | 2/2015 | Mintz et al. |
| 2016/0241436 A1 | 8/2016 | Fourie et al. |

OTHER PUBLICATIONS

Final Office Action received for U.S. Appl. No. 15/365,910 dated Dec. 26, 2018, 21 pages.
Non-Final Office Action received for U.S. Appl. No. 15/365,910 dated Aug. 9, 2019, 22 pages.
Final Office Action received for U.S. Appl. No. 15/365,910 dated Feb. 21, 2020, 19 pages.
Mohammed, A. A., et al. "SDN controller for network-aware adaptive orchestration in dynamic service chaining." 2016 IEEE NetSoft Conference and Workshops (NetSoft). IEEE, 2016. 5 pages.
"The Path to 5G with Programmable Mobility Management" Brocade White Paper. 2016. Published online at [https://www.brocade.com/content/dam/common/documents/content-types/whitepaper/brocade-path-to-5g-withprogrammable-mobility-management-wp.pdf], retrieved on Aug. 31, 2016, 8 pages.
Non-Final Office Action received for U.S. Appl. No. 15/365,910 dated Sep. 4, 2020, 20 pages.

INTENT-BASED SERVICE ENGINE FOR A 5G OR OTHER NEXT GENERATION MOBILE CORE NETWORK

RELATED APPLICATION

The subject patent application is a continuation of, and claims priority to, U.S. patent application Ser. No. 15/365,910, filed Nov. 30, 2016, and entitled "AN INTENT-BASED SERVICE ENGINE FOR A 5G OR OTHER NEXT GENERATION MOBILE CORE NETWORK," the entirety of which application is hereby incorporated by reference herein.

TECHNICAL FIELD

The subject disclosure relates to wireless communications, e.g., an intent-based service engine for fifth generation (5G) or other next generation mobile core network.

BACKGROUND

As communication networks evolve, new demands such as massive Internet of Things (IoT) communications, mission critical communications, and/or high throughput mobile broadband on the mobile network, create new challenges for the networking infrastructure providers to develop innovative and intelligent networking solutions that can deliver optimal connectivity as well as end user service quality. Conventional mobile services, built on mobile networks, have specific and explicit instructions and/or predefined mechanisms for provisioning and/or initiation of services. For example, services such as, a voice call, a web session, a messaging session, etc. each requires defined actions to be performed by network devices for initialization and/or set-up. This results in difficult and time-consuming service provisioning and initiation techniques and processes for new communication services. Further, conventional system do not provide the scalability and flexibility to address future dynamic service needs of evolving communication networks, for example, do not support integrated services that need multiple triggers to network actions.

DETAILED DESCRIPTION

Figure 1:
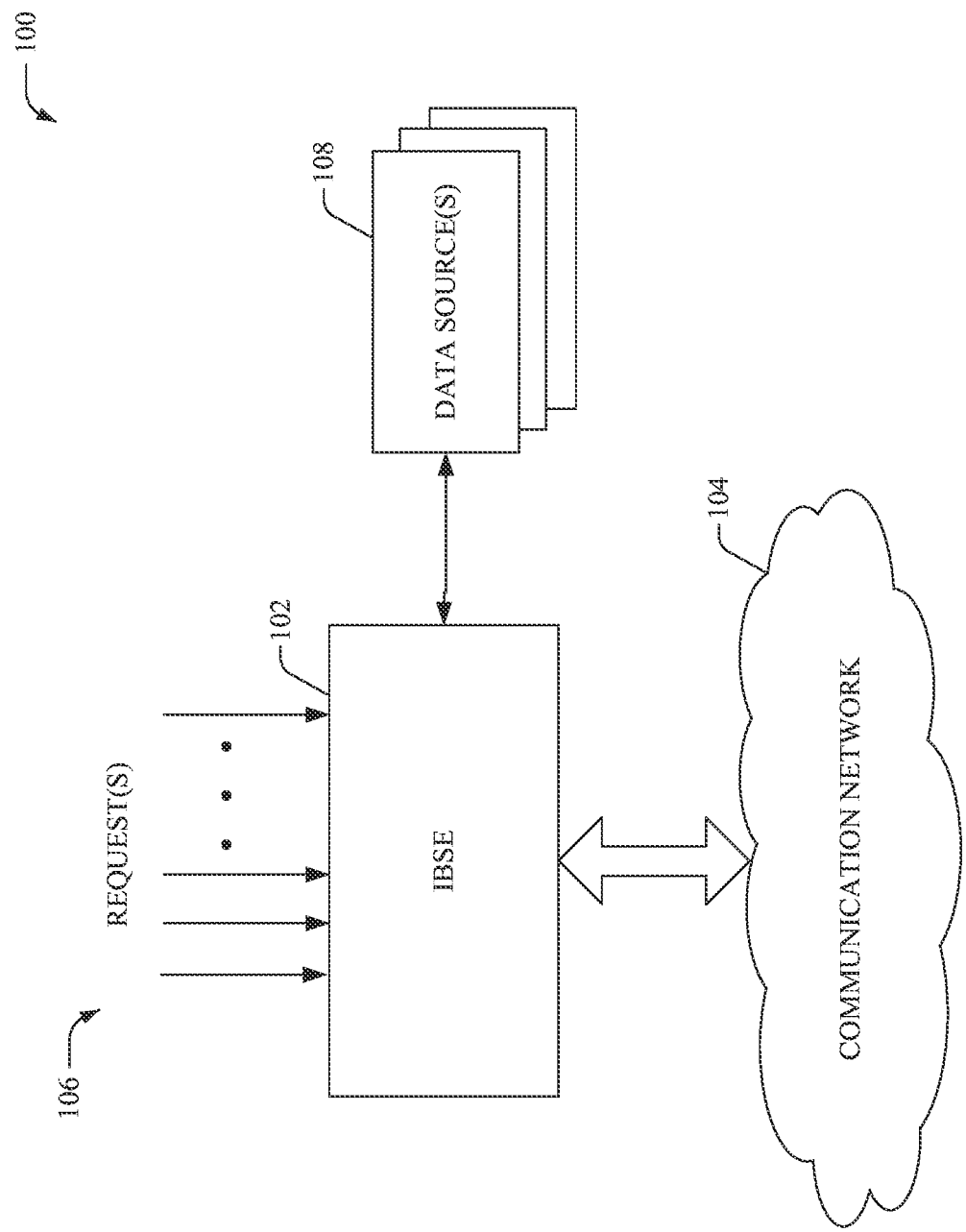
FIG. 1 illustrates an example system comprising an intent-based service engine (IBSE) for processing network service requests.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "agent," "engine," "client," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make an inference based on complex mathematical formalisms), which can provide simulated vision, sound recognition and so forth.

Conventional communication services are provisioned and triggered based on specific instructions from a service network. These services are typically independent in terms of provisioning and initiation, and separate network triggers are to be used for establishing each of the services. Further, conventional services employ network bindings between network elements, for example, between a core network element and an Internet protocol (IP) multimedia subsystem (IMS) element, that can be very tight. For every new service, specific bindings and/or network instructions are to be created, resulting in a time-consuming and complex process. Additionally, conventional applications that request the services are limited to handling each service separately and do not support multiple and/or integrated services.

The systems and methods disclosed herein provide a network service engine that is service context-aware, network resource aware, and can support intent-based instructions for one and/or multiple network services. In one aspect, the disclosed network service engine can receive a single instruction/message associated with the user's intent and/or situation, and can establish the necessary procedures to provide integrated services based on context data and/or network resources in real time. Aspects and/or features of the disclosed subject matter can be exploited in substantially any wired or wireless communication technology, including, but not limited to 5G and/or future technologies.

Referring initially to FIG. 1, there illustrated is an example system 100 that provides an intent-based service engine (IBSE) 102 for processing network service requests according to one or more aspects of the disclosed subject matter. In one aspect, the IBSE 102 can be a control plane element of a core network of a communication network (e.g., cellular network) 104. As an example, the core network of can comprise devices (e.g., gateways, servers, data stores, etc.) that provide communication services to user equipment (UE) that are connected to the communication network 104 via a wired and/or wireless access network (not shown). System 100 facilitates intent-based networking, wherein the IBSE 102 determines a user's goal (or intent) and selects appropriate (and/or optimal) action(s), which trigger network service(s) that are to be utilized to accomplish the goal. As an example, the action(s) and/or network service(s) can include, but are not limited to, establishing a phone call, transmitting a text message, notifying emergency and/or medical personnel, establishing a web service session, etc. in a synchronized manner.

According to an embodiment, the IBSE 102 can receive request(s) 106 from one or more UE connected to an access network (not shown). As an example, the requests 106 can be received via open and/or standard application program interfaces (APIs) and can include messages that represent intent and/or goals of an application and/or user of the UE. Additionally or alternatively, the messages can represent a user's current (and/or past/future) situation. In an aspect, the IBSE 102 can analyze and interpret the requests 106, identify one or more network services (e.g., a voice call, a text message, a web service, etc.) that can be utilized to handle the request and/or accomplish the goals, and accordingly, trigger appropriate service request(s) to the network 104, for example, via network-defined APIs. Moreover, the network services can be selected based on policy data (e.g., user-defined policies, operator-defined policies, etc.) and/or context data (e.g., real-time network resource availability, UE related data, subscriber information, presence data, etc.) retrieved from one or more network data sources 108. As an example, the network services can be initiated concurrently and/or in a specified order (e.g., defined by policy and/or priority data).

In one aspect, the communication network 104 can employ a modular functional infrastructure, wherein the IBSE 102 can be utilized to dynamically manage and assemble functional modules that perform and/or establish the network services. As an example, the functional modules can comprise modules that perform functions of, but are not limited to, switches, routers, home location register (HLR), serving GPRS support node (SGSN), gateway GPRS support node (GGSN), combined GPRS support node (CGSN), radio network controller (RNC), serving gateway (SGW), packet data network gateway (PGW), residential gateway (RGW), broadband remote access server (BRAS), carrier grade network address translator (CGNAT), deep packet inspection (DPI), provider edge (PE) router, mobility management entity (MME), element management system (EMS), etc. These functions can be further decomposed and dynamically connected based on service requirements.

In one example, system 100 can be employed in a next generation mobile network, for example, a 5G network, that provides advanced and/or integrated services that leverage new capabilities of the 5G network. Typically, the 5G network can provide enhanced mobile broadband, for example, ultra high bandwidth (e.g., 20 Gbps), high spectral efficiency (e.g., 3.5× of LTE), ultra dense networks, and/or energy efficiency. Further, the 5G network can provide ultra-reliable (e.g., high reliability greater than 99.999%) and low latency communications (e.g., ultra low latency of ~1 msec and/or low network access and synchronization time). Furthermore, the 5G network can facilitate massive machine type communication (e.g., ultra high density ($10^6$/ sq km), long battery life (10 years+), high system gain (better than NB-IoT and more efficient)).

Figure 2:
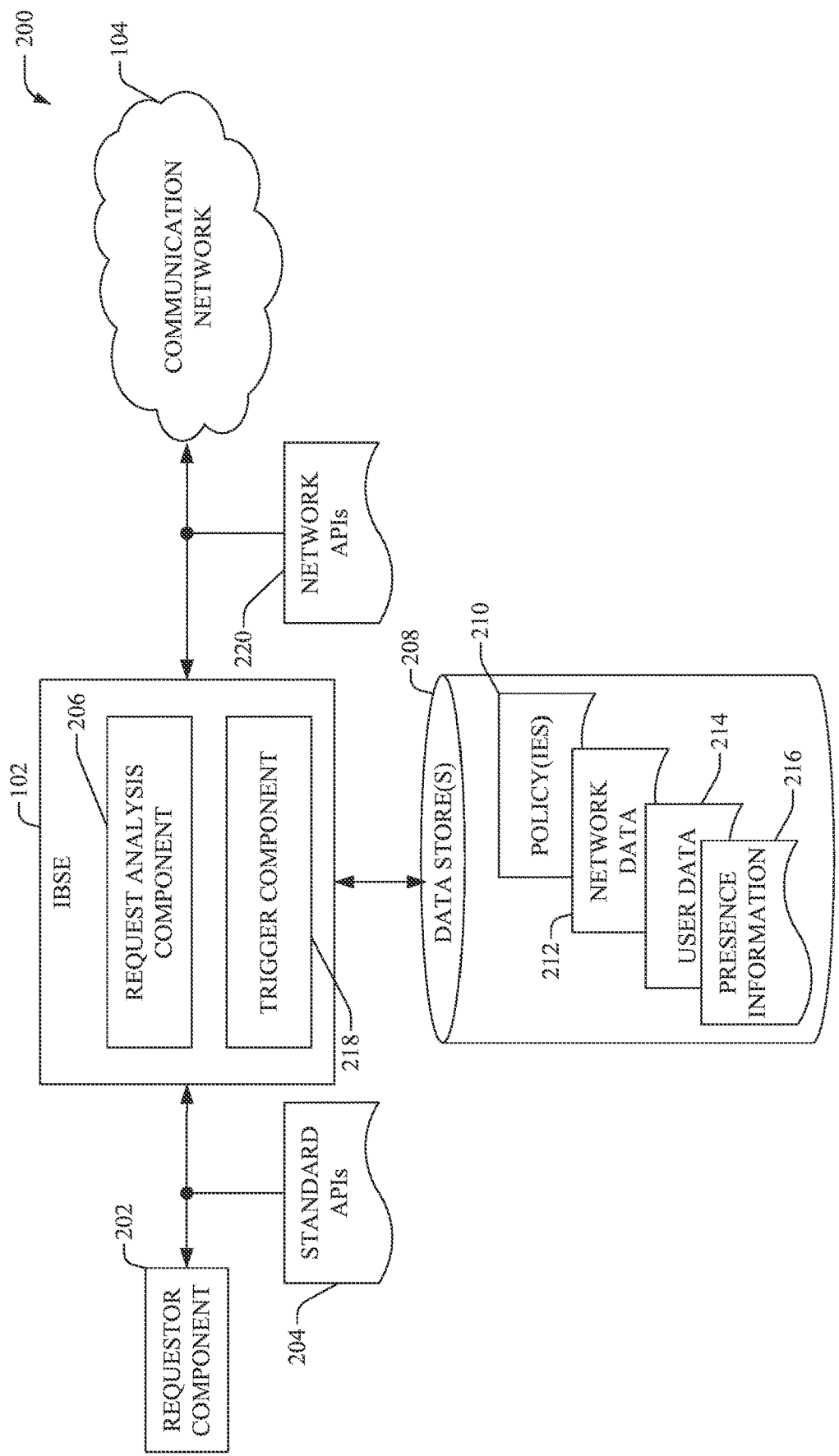
FIG. 2 illustrates an example system for dynamically triggering network services, in accordance with one or more embodiments of the subject disclosure.

Referring now to FIG. 2, there illustrated is an example system 200 for dynamically triggering network services, in accordance with an aspect of the subject disclosure. It is noted that the IBSE 102 and communication network 104 can comprise functionality as more fully described herein, for example, as described above with regard to system 100. Although system 200 is described with respect to a 5G network, it is noted that the subject disclosure is not limited to 5G networks and can be utilized in most any communication network. Moreover, system 200 provides an intelligent, programmable, and dynamic network architecture that can be employed to perform intent-based and context-aware service provisioning.

According to an embodiment, the IBSE 102 can communicate with a requestor component 202 via open and standardized APIs 204 (e.g., non-proprietary and/or protocol independent APIs). As an example, the requestor component 202 can be part of most any UE, such as, but not limited to consumer electronic devices, for example, a tablet computer, a digital media player, a digital photo frame, a digital camera, a media player, a cellular phone, a personal computer, a personal digital assistant (PDA), a smart phone, a laptop, a gaming system, set top boxes, home security systems, Internet of Things devices, connected vehicles, at least partially automated vehicles (e.g., drones), etc. In one aspect, a request sent by the by a requestor component 202 can comprise one or more messages indicative of a problem statement, a situation, and/or a user goal. For example, a user can state his/her intention or situation, such as "I have injured my leg while hiking and need help." A request analysis component 206 can analyze the request to determine the user's goal, objective, and/or intent. Moreover, the request analysis component 206 can parse keywords from the message(s) and utilize most any machine learning techniques to determine the goal, objective, and/or intent. In one example, a feedback mechanism can also be established to confirm with the requester the nature of the requests before any actions are taken.

Further, the request analysis component 206 can access information from data stores 208 to select one or more network services that are to be established to achieve the user goal. In one aspect, the information can comprise user-defined, service provider-defined, and/or network operator-defined policy(ies) 210. Additionally or optionally, the information can comprise context data related to the communication network 104, for example, network data 212 representing real-time availability of network resources. Further, the information can comprise context data related to the requestor component 202, for example, user data 214, such as, but not limited to user device data (e.g., device make, model, type), user application data, user subscription data (e.g., services subscribed by the user), user account information, user contact list (e.g., contact information for friends, family, and/or in case of emergency contacts of the user), UE location, etc. Furthermore, the information can comprise presence information associated with devices that are to be utilized to establish the network service. For example, the presence information can indicate whether a user/device is currently connected to the network, or a communication status (e.g., busy, idle, away, do not disturb, etc.) associated with the user/device that conveys ability and/or willingness of a user/device to establish the network service.

In one aspect, the trigger component 218 can communicate with devices of the communication network 104 via network-specific APIs 220 to provision, initiate, and/or establish the selected network services. As an example, each service can be represented by one or more network modules (e.g., expressed, represented, and/or accessed as resources of communication network 104) that can be dynamically assembled based on the policy(ies) 210. The trigger component 218 can select, in real time, at least a portion of the network modules to form a uniform resource for a specific service, for a specific user, at a specified time.

Continuing with the above example scenario wherein the user is injured while hiking, the request analysis component 206 can employ the information from data stores 208 to determine entities that the user intends to contact (e.g., the user's family members), location and/or availability of the entities (e.g., based on presence data), optimal communication techniques, etc., and determine available actions to establish one or more services (e.g., call 911, call or text, or send messages to family members, notify other related parties such as doctors, police, rangers, etc.), for example, based on predefined rules and/or policies 210. For example, a policy can specify that for emergency scenario, initiate an emergency call and concurrently, notify locals (e.g., other users that have subscribed to the service) located within a defined distance from the UE of the emergency via a text message. Accordingly, multiple services can be triggered (e.g., by the IBSE 102) in response to receiving a message from the requestor component 202.

Further, the request analysis component 206 can also determine the current network resources available that provide the optimal communications, and provide other information for these actions (e.g., determine a hospital within a defined distance from the UE, send traffic information to the first responders, and/or notify the hospital of the user's situation/injuries, etc.). It is noted that the subject specification is not limited to the above example and most any service that trigger multiple actions simultaneously (or substantially simultaneously) with the intelligence of the requestor's intention, current situation, preferences, contact information, and/or the network resources, can be employed.

It is noted that the data store(s) 208 can include volatile memory(s) or nonvolatile memory(s), or can include both volatile and nonvolatile memory(s). Examples of suitable types of volatile and non-volatile memory are described below with reference to FIG. 9. The memory (e.g., data stores, databases) of the subject systems and methods is intended to include, without being limited to, these and any other suitable types of memory. Although FIG. 2 depicts the data store(s) 208 being external to the IBSE 102, the subject specification is not that limited and one or more of the data store(s) 208 can be included within (completely or partially) the IBSE 102.

Figure 3:
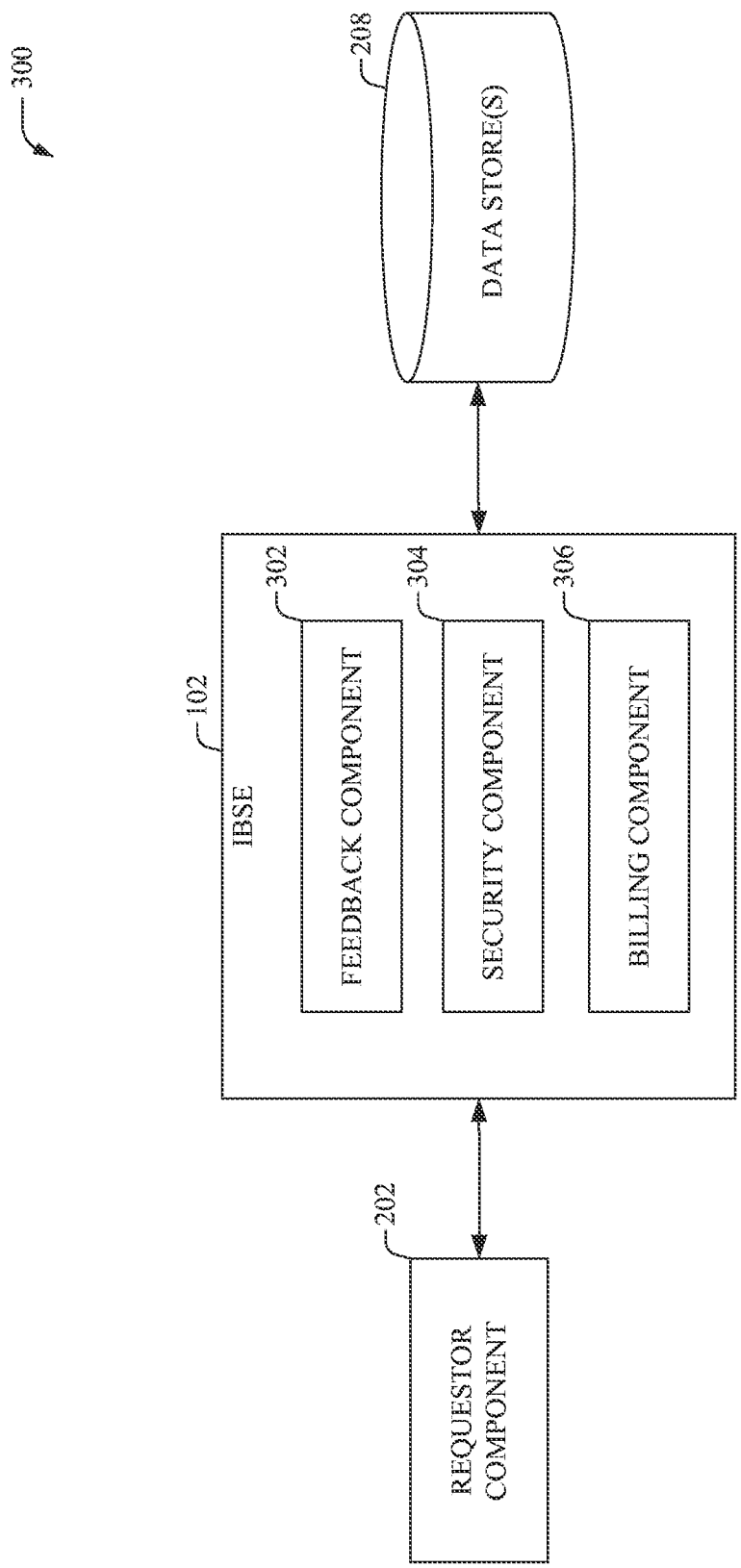
FIG. 3 illustrates an example system for processing network service requests, in accordance with one or more embodiments of the subject disclosure.

Referring now to FIG. 3, there illustrated is an example system 300 for processing network service requests, in accordance with an aspect of the subject disclosure. In one example, the IBSE 102 can comprise a service engine that analyzes a user's goal and/or evaluates a user's current situation to identify network services that are to be established to accomplish the goal and/or that are to be established in response to the situation. Further, the IBSE 102 can manage network resources that are to be employed to establish the network services. In one aspect, the IBSE 102 can manage network resources dynamically using NFV, and/or SDN, and other technologies. It is noted that the service controller component 102, requestor component 202, and data stores(s) 208 can comprise functionality as more fully described herein, for example, as described above with regard to systems 100 and 200. Additionally, although system 300 is described with respect to a 5G network, it is noted that the subject disclosure is not limited to 5G networks and can be utilized in most any communication network.

In an aspect, the IBSE 102 can receive situational data from the requestor component 202, for example, that describes a user's current condition/situation (e.g., the user is injured in a remote location, the user has run out of a specific product, the user is travelling to a store, etc.). The IBSE 102 can analyze the received data to determine the user's intent/goal (e.g., the user needs help, the user would like to purchase the specific product, the user would like to receive information on traffic and/or navigational directions to the store, etc.). According to an embodiment, a feedback component 302 can be utilized to provide the determined intent/goals to the user for confirmation. As an example, confirmation can be received via a series of text prompts and/or voice messages sent to the requestor component 202. Additionally or alternatively, the feedback component 302 can be utilized to notify the user (e.g., via transmission to the requestor component 202) of a set of network services that have been selected (e.g., by the IBSE 102) prior to their initiation. In one example, the user can verify and/or select a subset of the network services that are to be initiated. In one example, the network services can be initiated subsequent to receiving confirmation from the requestor component 202. In another example, the network services can be initiated unless a cancellation request to deny initiation of one or more of the services is received from the requestor component 202.

Further, the IBSE 102 can comprise a security component 304 that can be utilized to control access to specified network services. For example, access control can be based on access parameters such as, but not limited to, user role, device type, time/date, etc., that can be defined by a network operator. In an aspect, the security component 304 can verify that the requestor component 202 is authorized to access the determined network service. If determined by the security component 304 that the requestor component 202 is authorized to access the network service, the IBSE 102 can initiate establishment of the service. Alternatively, if determined by the security component 304 that the requestor component 202 is not authorized to access the network service, initiation of the network service is prohibited and/or another network service, which the requestor component 202 has been authorized to access, is selected/initiated.

Furthermore, the IBSE 102 can comprise a billing component 306 that can facilitate application of a fee for an initiated service. In one aspect, the billing component 306 can employ various billing and/or charging rules, for example, based on one or more the policies 210 stored in data store(s) 208, to determine an appropriate fee for a network service. Further, the billing component 306 can provide information associated with the fee to a billing server of the communication network (e.g., communication network 104). Although FIG. 3 depicts the billing component 306 residing within the IBSE 102, the subject specification is not that limited and at least a portion of the billing component 306 can be coupled (e.g., remotely or locally) to the IBSE 102.

Figure 4:
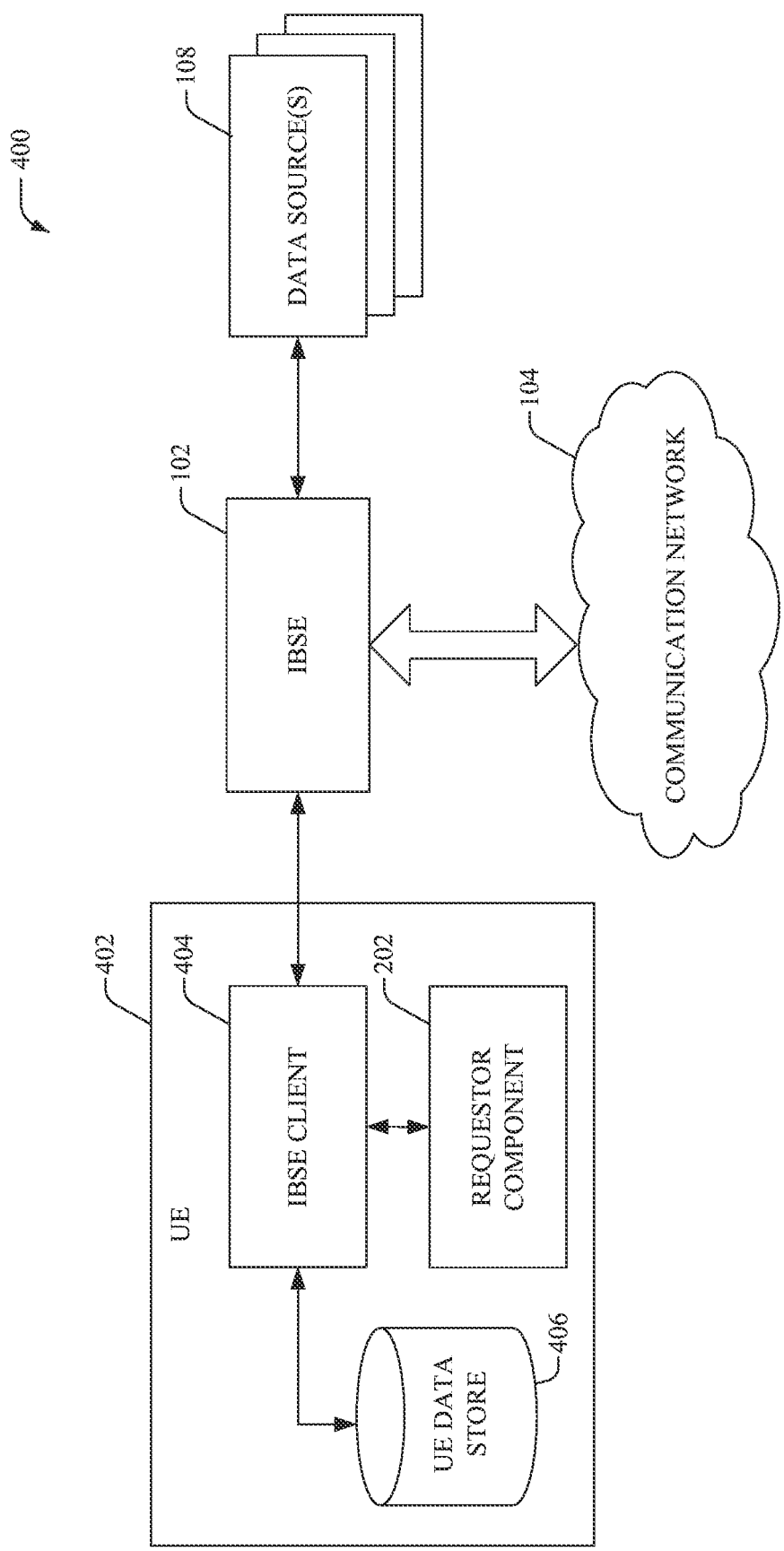
FIG. 4 illustrates an example system comprising an IBSE client for processing network service requests.

Referring now to FIG. 4, there illustrated is an example system 400 comprising an IBSE client for processing network service requests, according to an aspect of the subject disclosure. It is noted that the IBSE 102, communication network 104, data source(s) 108, and requestor component 202 can comprise functionality as more fully described herein, for example, as described above with regard to systems 100-300.

According to an embodiment, a UE 402 can comprise an IBSE client 404 that can be utilized to dynamically initiate one or more network services based on a determined user goal and/or scenario. In one aspect, the IBSE client 404 is substantially similar to the IBSE 102 and can comprise functionality as more fully described herein with respect to IBSE 102, for example, as described above with regard to systems 100-300. In one aspect, the IBSE client 404 can receive, from the requestor component 202, request data indicative of a user's current condition/situation and can analyze the data with information (e.g., device data, user preferences, historical data, contact list data, etc.) from a UE data store 406 and/or information received from IBSE 102 and/or data sources 108 to determine one or more user goals. As an example, the request data can comprise an audio/video message and the IBSE client 404 can perform natural language processing to determine the one or more user goals. Further, the IBSE client 404 can select one or more network services that are to be performed to achieve the user goals. In one aspect, the IBSE client 404 can initiate the selected services, or alternatively, can instruct the IBSE 102 to initiate the selected services.

According to an embodiment, the systems disclosed herein with respect to systems 100-400 provides several non-limiting advantages and features such as, but not limited to, (i) natural service interaction based on human intent; (ii) efficient and optimal interaction especially in urgent/emergency situations; (iii) automatically and dynamically initiated integrated services with multiple service requests to the communication network; (iv) real-time integration of network resources and network contextual information that integrate all service aspects; (v) standard APIs and interfaces to create new integrated services; (vi) leverage cutting edge technologies such as deep learning and big data in future evolution of the IBSE 102; and/or (vii) the IBSE 102 can be seamlessly integrated into the 5G network without impacting underlying infrastructure.

Figure 5:
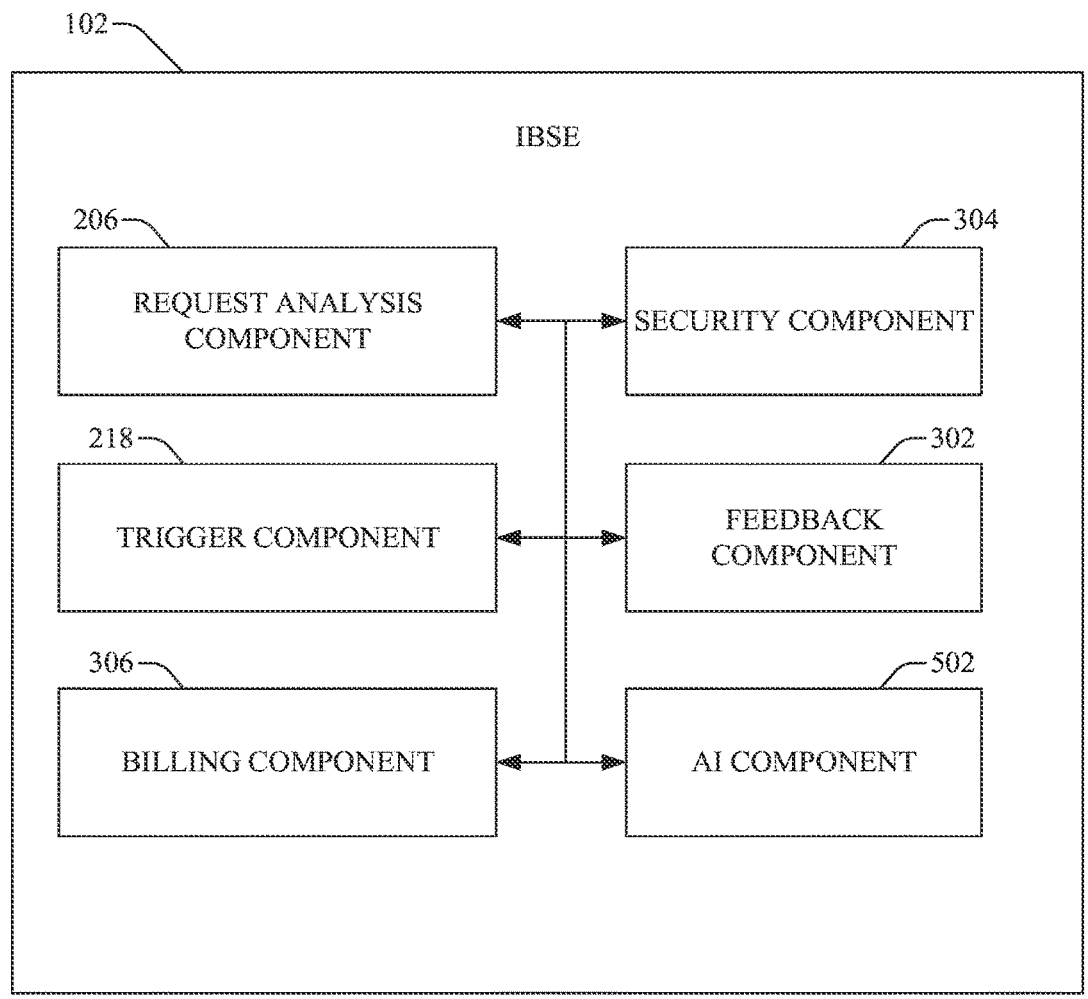
FIG. 5 illustrates an example system that facilitates automating one or more features in accordance with the subject embodiments.

Referring now to FIG. 5, there illustrated is an example system 500 that employs an artificial intelligence (AI) component (502) to facilitate automating one or more features in accordance with the subject embodiments. It can be noted that the IBSE 102, request analysis component 206, trigger component 218, feedback component 302, security component 304, and billing component 306 can comprise functionality as more fully described herein, for example, as described above with regard to systems 100-400.

In an example embodiment, system 500 (e.g., in connection with intent-based service provisioning) can employ various AI-based schemes (e.g., intelligent processing/analysis, machine learning, etc.) for carrying out various aspects thereof. For example, a process for determining user goals, user intent, and/or user situations, selecting network services that can be utilized to accomplish the user goal, determining a set of optimal network services, assembling resources to establish a selected network service, etc. can be facilitated via an automatic classifier system implemented by AI component 502. Moreover, the AI component 502 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 702 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 502 can be used to automatically learn and perform a number of functions, comprising but not limited to determining according to a predetermined criteria, user goals, user intent, and/or user situations, a set of network services that can be utilized to accomplish the user goal, a subset of optimal network services, resources to establish a selected network service, etc. The criteria can comprise, but is not limited to, historical patterns and/or trends, network operator preferences and/or policies, application/service provider preferences, predicted traffic flows, event data, latency data, reliability/availability data, current time/date, contact list data, subscription data, location data, presence data, and the like.

Figure 6:
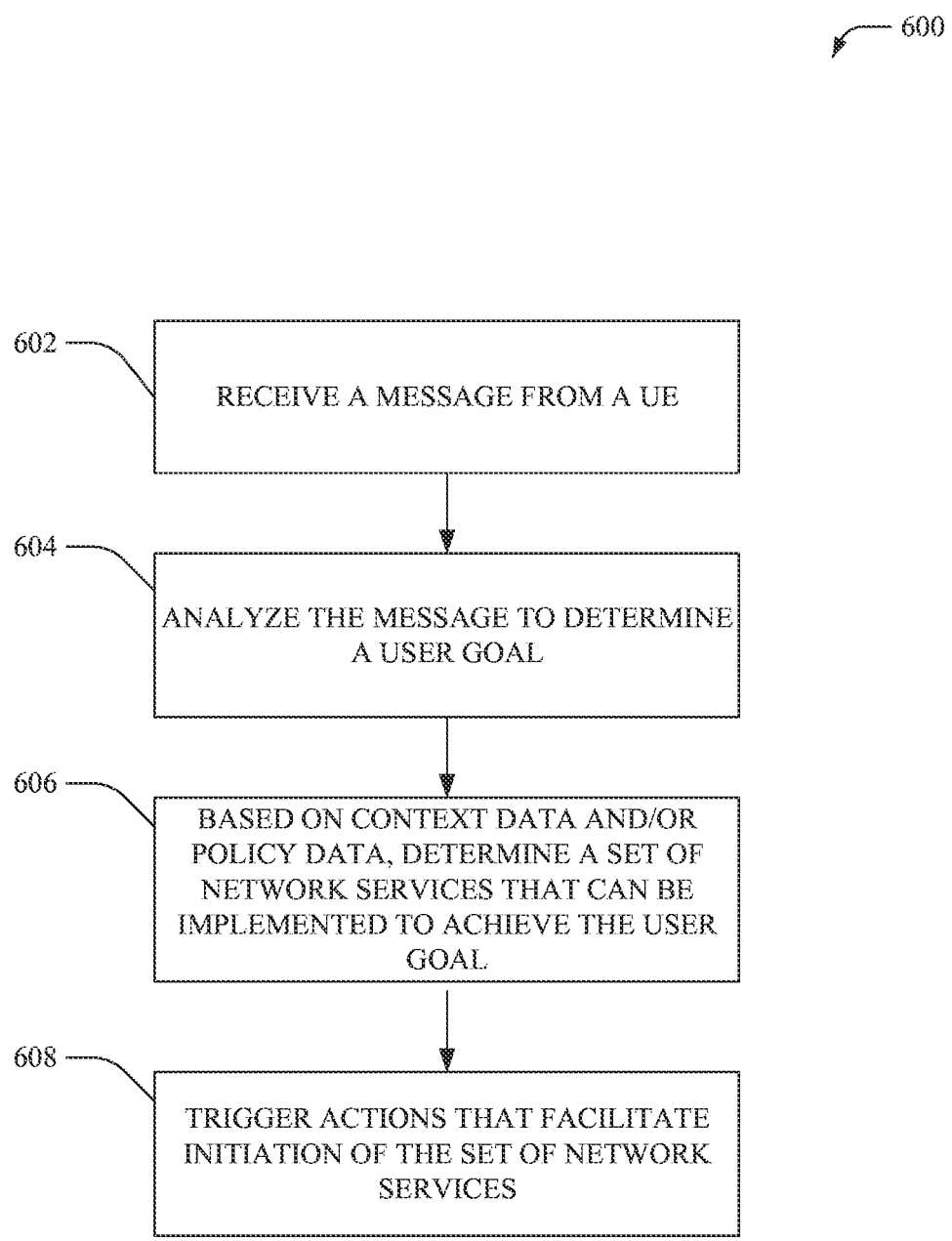
FIG. 6 illustrates an example method that supports intent-based service triggers within a communication network.
Figure 7:
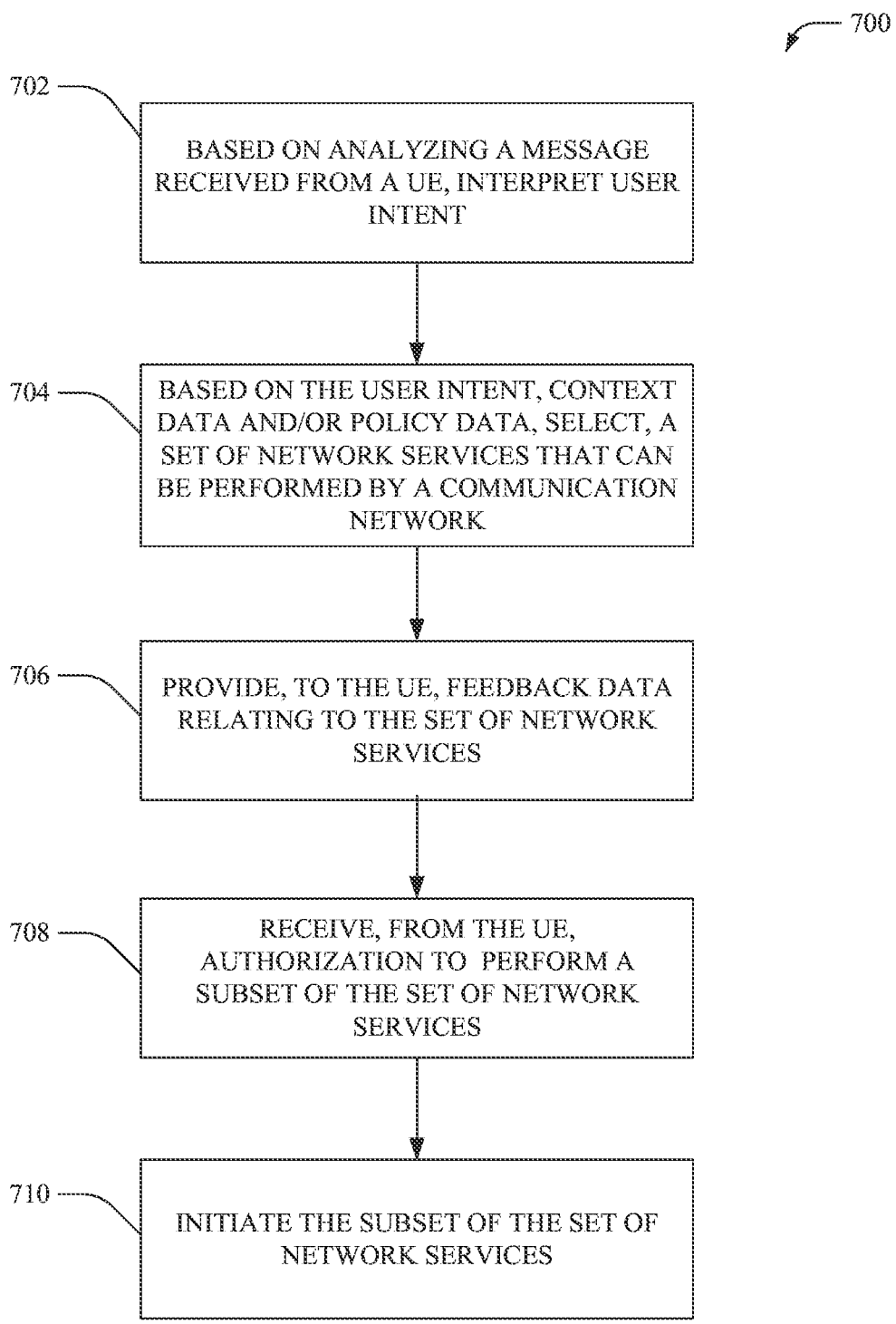
FIG. 7 illustrates an example method that facilitates providing feedback during intent-based service provisioning.

FIGS. 6-7 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6 there illustrated is an example method 600 that supports intent-based service triggers within a communication network, according to an aspect of the subject disclosure. In an aspect, method 600 can be implemented by one or more network devices (e.g., control plane device) of a communication network (e.g., cellular network). At 602, a message can be received from a UE coupled to the communication network. As an example, the message can comprise an audio message, a video message, textual data, an image, etc. that can be received via a standard and/or open API (e.g., non-proprietary and/or protocol agnostic API). Further, in one aspect, the message does not explicitly specify a network service that is to be initiated. Instead, the message can comprise information related to current user conditions, location, objectives, etc. For example, the message can state, "I'm lost and alone." At 604, the message can be analyzed to determine a user goal. For example, it can be determined that the user would like to receive navigational data, contact emergency personnel, notify a contact of running late, etc. In one aspect, a list of user goals can be determined and a set of the user goals that have a probability higher than a defined probability can be selected.

Further, at 606, a set of network services (e.g., voice calls, messaging service, web service, navigation service, ecommerce service, etc.) that can be implemented to achieve the user goal can be determined based on context data and/or policy data. In one aspect, the network services can be determined based on mapping the user goal to a common information model that can be understood by the underlying communication network. The context data can comprise information related to the user and/or user device, such as, but not limited to, UE (e.g., device type), user preferences, user subscriptions (e.g., services subscribed by the user), contact list data (e.g., telephone numbers for friends and/or family members), address book data, calendar data (e.g., meetings, project timelines, schedules, etc.), vehicle information (e.g., make, model of a vehicle that the UE is coupled to and/or located within), social networking data (e.g., information that can be utilized to identify a social relationship between an entity the user), power level (e.g., battery status) of the UE, location associated with the UE, destination of the UE, etc. Further, the context data can comprise real-time information related to the communication network, such as, but not limited to, resource availability, bandwidth, load, presence data (e.g., availability status of other devices coupled to the communication network), etc. The policy data can be defined by the user, service provider and/or network operator. For example, a policy can specify whom to contact (e.g., family, friends, emergency personnel, medical persons, etc.), how to contact (e.g., text message, call, etc.), when to contact (e.g., in case of emergency, based on message priority, etc.), information that is to be sent (e.g., UE location, user's medical history, navigation/traffic data, etc.).

At 608, actions that facilitate initiation of the set of network services can be triggered. For example, multiple services can be initiated simultaneously (or substantially simultaneously) and synchronously. The initiation can comprise a set of network-defined APIs that establish the network services. Continuing with the above example scenario wherein the user states that he/she is lost, network services mapped to the user goals can be initiated. For example, navigation data indicative of a route to the nearest gas station, store, and/or building can be provided to the UE; an emergency call can be initiated; text messages stating that the user is running late with an estimated time of arrival can be sent to contacts that the user is scheduled to meet (e.g., determined based on calendar data), etc. It is noted that the subject specification is not limited to the above example, and most any services can be initiated based on an analysis of user intent/goal.

FIG. 7 illustrates an example method 700 that facilitates providing feedback data during intent-based service provisioning, according to an aspect of the subject disclosure. As an example, method 700 can be implemented by one or more network devices (e.g., control plane device) of a communication network (e.g., cellular network). At 702, user intent (e.g., a goal and/or an objective) can be interpreted based on analyzing a message received from a UE. At 704, based on the user intent, context data (e.g., real-time network data, user-related data, etc.), and/or policy data (e.g., user-defined policy, network operator-defined policy, service provider-defined policy, etc.), a set of network services (e.g., communication service, a web service, a content delivery service, etc.), that can be performed by a communication network, can be selected. In one aspect, the user intent can be mapped to a common information model that can be understood by the communication network to facilitate the selection of the network services. At 706, feedback data related to the set of network services can be provided to the UE. For example, the UE can be notified of the set of network services that can be performed. In response, at 708, authorization to perform a subset of the set of network services can be received from the UE. On receiving the authorization, at 710, the subset of the set of network services can be initiated, for example, via network-defined API(s).

Figure 8:
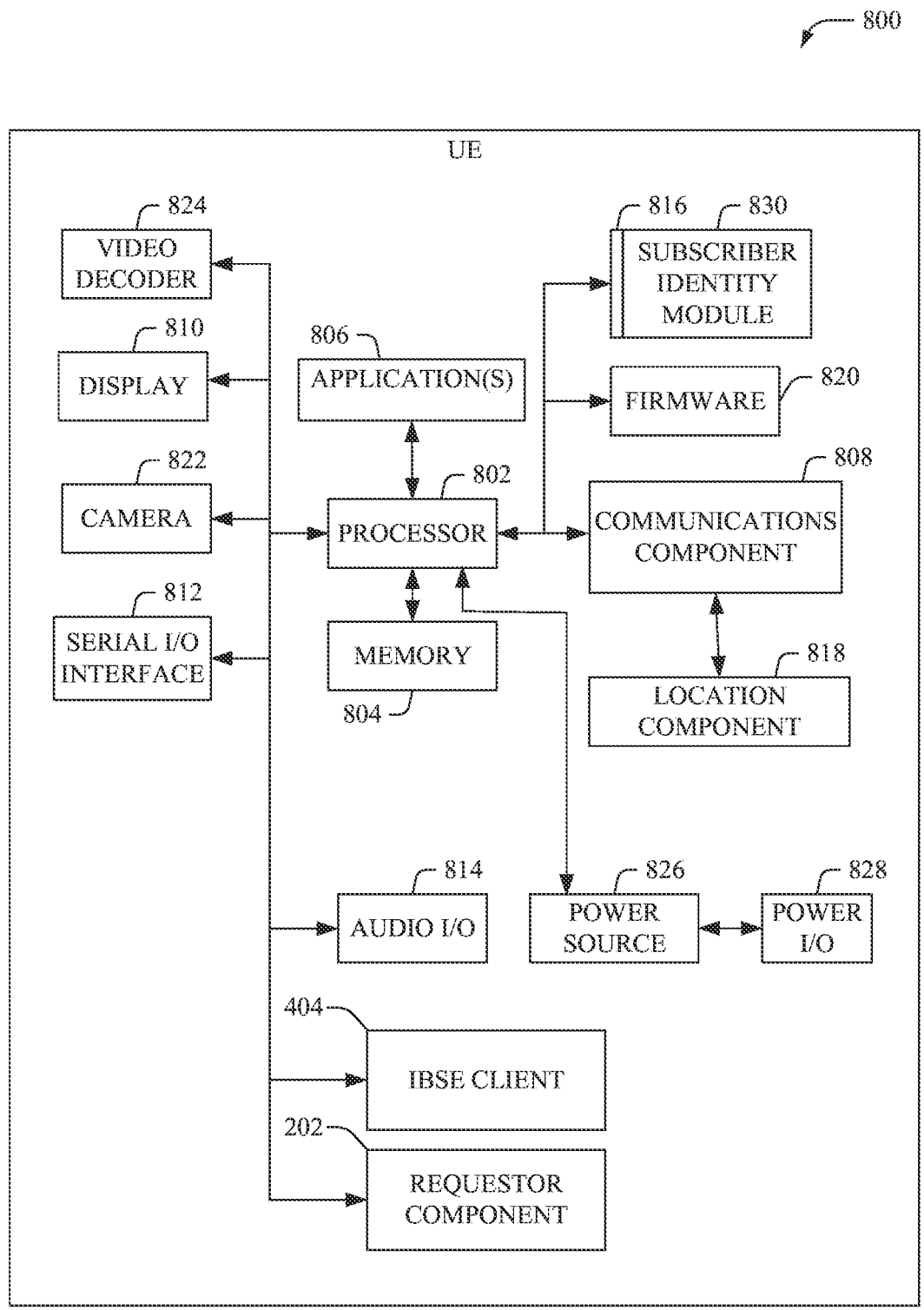
FIG. 8 illustrates an example block diagram of a user equipment suitable for intent-based service initiation.
Figure 9:
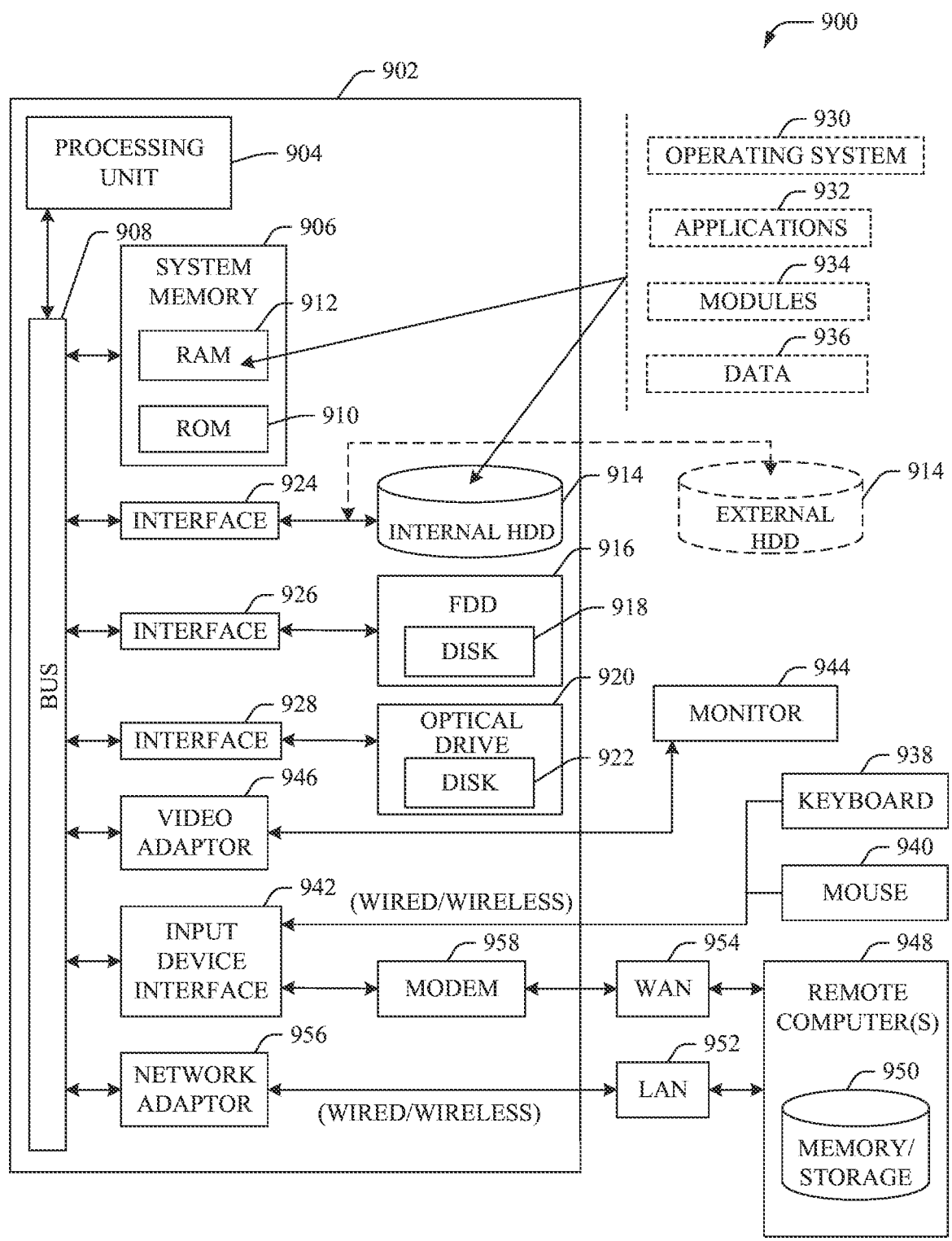
FIG. 9 illustrates a block diagram of a computer operable to execute the disclosed communication architecture.

To provide further context for various aspects of the subject specification, FIGS. 8 and 9 illustrate, respectively, a block diagram of an example UE 800 that facilitates intent-based service initiation as described herein and a wireless communication environment 900, with associated components for operation and/or management of dynamic communication service triggering techniques described herein.

Referring now to FIG. 8, there is illustrated a block diagram of a UE 800 that facilitates intent-based service initiation in accordance with the subject specification. Moreover, the UE 800 can be substantially similar to and include functionality associated with UE 402, described herein. In one aspect, the UE 800 can include a processor 802 for controlling all onboard operations and processes. A memory 804 can interface to the processor 802 for storage of data and one or more applications 806 being executed by the processor 802. A communications component 808 can interface to the processor 802 to facilitate wired/wireless communication (e.g., cellular communication) with external systems (e.g., access point device of a radio access network). The communications component 808 can interface to a location component 818 (e.g., GPS transceiver) that can facilitate location detection of the UE 800.

The UE 800 can include a display 810 (e.g., screen and/or touch screen) for displaying received content (and/or content to be transferred) and/or for displaying text information related to operating and using the device features. A serial I/O interface 812 is provided in communication with the processor 802 to facilitate serial communication (e.g., USB, and/or IEEE 1394) via a hardwire connection. Audio capabilities are provided with an audio I/O component 814, which can include a speaker for the output of audio signals related to, for example, recorded data or telephony voice data, and a microphone for inputting voice signals for recording and/or telephone conversations.

Further, the UE 800 can include a slot interface 816 for accommodating a subscriber identity module (SIM) 830. A unique CTN is associated with the SIM 830 that can be utilized as a device identifier for UE 800. Firmware 820 is also provided to store and provide to the processor 802 startup and operational data. The UE 800 can also include a media capture component 822 such as a camera and/or a video decoder 824 for decoding encoded multimedia content. Further, the UE 800 can include a power source 826 in the form of batteries, which power source 826 interfaces to an external power system or charging equipment via a power I/O component 828. In addition, the UE 800 can comprise the requestor component 202 and the IBSE client 404, which can be stored in memory 804 and/or implemented by an application 806. The requestor component 202 and the IBSE client 404 can include respective functionality, as more fully described herein, for example, with regard to systems 100-500.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 9, the example environment 900 for implementing various aspects of the specification comprises a computer 902, the computer 902 comprising a processing unit 904, a system memory 906 and a system bus 908. As an example, the component(s), engine(s), application(s) server(s), equipment, system(s), interface(s), gateway(s), controller(s), node(s), entity(ies), function(s), agent(s), and/or device(s) (e.g., IBSE 102, functional module(s) 104, requestor component 202, request analysis component 206, communication network 104, data source(s) 108, requestor component 202, request analysis component 206, trigger component 218, data store(s) 208, feedback component 302, security component 304, billing component 306, UE 402, IBSE client 404 data store(s) 302, AI component 502, etc.) disclosed herein with respect to systems 100-500 can each comprise at least a portion of the computer 902. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, comprising an operating system 930, one or more application programs 932, other program modules 934 and program data 936. All or portions of the operating system, applications, modules, and/or data can also be cached in the RAM 912. It is noted that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also comprise a wireless access point disposed thereon for communicating with the wireless adapter 956.

When used in a WAN networking environment, the computer 902 can comprise a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be noted that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
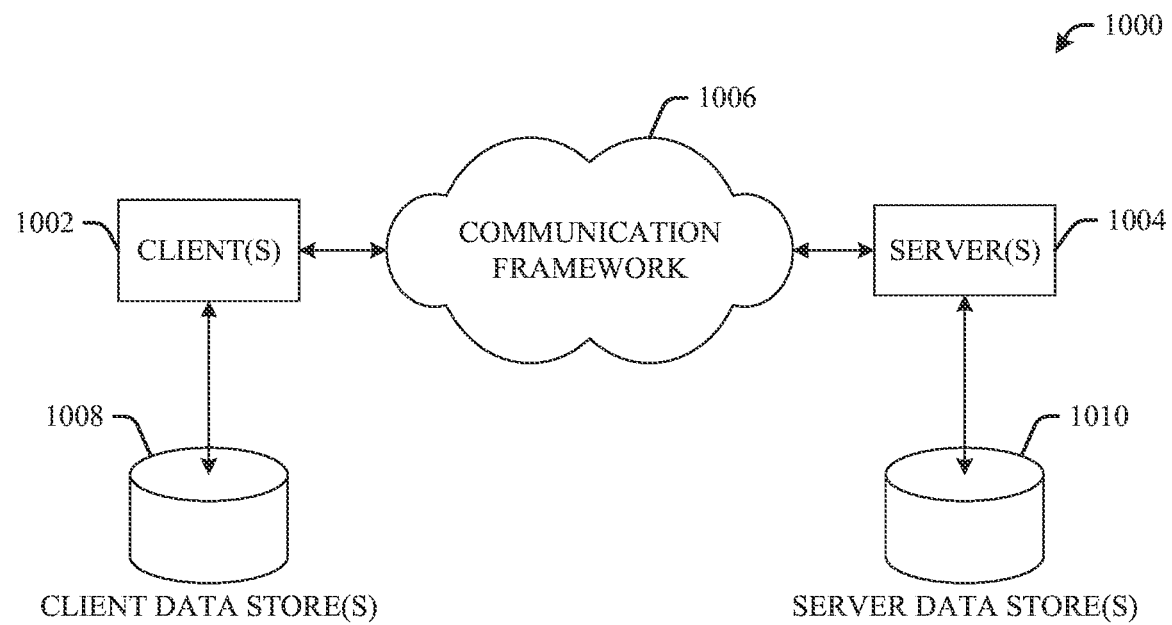
FIG. 10 illustrates a schematic block diagram of a computing environment in accordance with the subject specification

Referring now to FIG. 10, there is illustrated a schematic block diagram of a computing environment 1000 in accordance with the subject specification. The system 1000 comprises one or more client(s) 1002. The client(s) 1002 can be hardware and/or software (e.g., threads, processes, computing devices).

The system 1000 also comprises one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may comprise a cookie and/or associated contextual information, for example. The system 1000 comprises a communication framework 1006 (e.g., a global communication network such as the Internet, cellular network, etc.) that can be employed to facilitate communications between the client(s) 1002 and the server(s) 1004.

Communications can be facilitated via a wired (comprising optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. Network equipment, comprising:
   a processor; and
   a memory that stores executable instructions that, when executed by the processor, facilitate performance of operations, comprising:
      based on analyzing message data received from a user equipment via a protocol agnostic application programming interface, determining goal data that represents potential goals of a user identity associated with the user equipment;
      selecting a subgroup of the potential goals that have a probability of being accurate that is higher than a defined probability;
      selecting a group of network services that is employable to achieve the subgroup of the potential goals; and
      initiating performance of the group of network services via a communication network comprising the network equipment.

2. The network equipment of claim 1, wherein selecting the group of network services comprises selecting the group of network services based on defined policy data and context data.

3. The network equipment of claim 2, wherein the context data comprises network related information representing an availability of a network resource of the communication network.

4. The network equipment of claim 2, wherein the context data comprises device related information associated with the user equipment.

5. The network equipment of claim 2, wherein the user equipment is a first user equipment, and wherein the context data comprises presence data that represents a communication status of a second user equipment employable to facilitate establishing the network service.

6. The network equipment of claim 1, wherein the group of network services comprises different services.

7. The network equipment of claim 1, wherein the initiating comprises establishing the group of network services via a group of network-defined application program interfaces.

8. The network equipment of claim 1, wherein the initiating comprises initiating respective services included in the group of services concurrently.

9. The network equipment of claim 1, wherein the operations further comprise:
- transmitting feedback data indicative of the group of network services to the user equipment; and
- as a function of the transmitting, receiving, from the user equipment, authorization data that authorizes the performance of the initiating of the group of network services.

10. The network equipment of claim 1, wherein selecting the group of network services comprises selecting the group of network services in response to determining that the user equipment satisfies a security criterion associated with access to the network service.

11. The network equipment of claim 1, wherein the operations further comprise:
- based on defined policy data, determining fee data representative of a fee associated with the group of network services.

12. The network equipment of claim 1, wherein the message data is indicative of a problem statement specifying a problem and wherein the subgroup of the potential goals is employable to solve the problem.

13. The network equipment of claim 1, wherein the message data comprises situation data representing a situation associated with the user equipment.

14. A method, comprising:
- facilitating, by network equipment comprising a processor, receiving message data from a user equipment via a protocol agnostic application programming interface;
- determining, by the network equipment based on analyzing the message data, objective data that represents potential objectives of a user identity associated with the user equipment;
- selecting an objective of the potential objectives that is associated with a higher probability of reflecting a true objective of the user identity relative to other ones of the potential objectives other than the objective;
- determining, by the network equipment, communication services that are employable to achieve the objective; and
- initiating, by the network equipment, performance of the communication services via a communication network comprising the network equipment.

15. The method of claim 14, wherein determining the communication services comprises determining the communication services based on defined policy data representative of a defined network policy and context data representative of a context of the communication network.

16. The method of claim 14, wherein determining the communication services comprises determining the communication services based on availability data indicative of an availability of a network resource of the communication network.

17. The method of claim 14, wherein determining the communication services comprises determining the communication services based on subscriber account information related to the user equipment.

18. The method of claim 14, wherein determining the communication services comprises determining the communication services based on contact data representing a contact list associated with the user equipment.

19. A non-transitory machine-readable medium, comprising executable instructions that, when executed by a processor of network equipment, facilitate performance of operations, comprising:
- receiving situation data associated with a user equipment via a protocol agnostic application programming interface;
- based on the situation data, determining goal data that represents potential goals associated with a user identity authorized for use in connection with the user equipment;
- selecting a goal of the potential goals that is associated with a higher probability of reflecting a true goal of the user identity relative to other ones of the potential goals other than the goal;
- determining communication services that are employable to achieve the goal; and
- initiating performance of the communication services via a communication network comprising the network equipment.

20. The non-transitory machine-readable medium of claim 19, wherein the communication services comprise different communication services, and wherein the determining of the communication services comprises determining the different communication services based on defined policy data and context data representative of a context associated with the user equipment.

* * * * *